United States Patent
Ninagawa et al.

(10) Patent No.: US 8,561,682 B2
(45) Date of Patent: Oct. 22, 2013

(54) TUBE AND HEAT EXCHANGER USING THE SAME, AND METHOD OF MANUFACTURING TUBE

(75) Inventors: Toshihide Ninagawa, Chita (JP); Tatsuo Ozaki, Okazaki (JP); Hayaki Teramoto, Okazaki (JP); Shin Takewaka, Kariya (JP)

(73) Assignee: Denso Corporation, Kariya (JP)

( * ) Notice: Subject to any disclaimer, the term of this patent is extended or adjusted under 35 U.S.C. 154(b) by 777 days.

(21) Appl. No.: 12/798,456

(22) Filed: Apr. 5, 2010

(65) Prior Publication Data

US 2010/0252244 A1    Oct. 7, 2010

(30) Foreign Application Priority Data

Apr. 6, 2009 (JP) .................... 2009-92390

(51) Int. Cl.
*F28F 1/00* (2006.01)
*F28F 19/00* (2006.01)

(52) U.S. Cl.
USPC ........................ 165/177; 165/134.1

(58) Field of Classification Search
CPC ................. F28D 1/04; F28D 1/0391
USPC ....... 165/177, 134.1, 180; 428/654; 29/890.053, 890.054
See application file for complete search history.

(56) References Cited

U.S. PATENT DOCUMENTS

| | | | | |
|---|---|---|---|---|
| 4,828,794 A | * | 5/1989 | Scott et al. | 420/529 |
| 5,292,595 A | * | 3/1994 | Yamauchi et al. | 428/654 |
| 6,555,251 B2 | | 4/2003 | Kilmer | |
| 6,896,977 B2 | | 5/2005 | Nishimura et al. | |
| 7,247,392 B2 | * | 7/2007 | Sugano et al. | 428/654 |
| 7,250,223 B2 | * | 7/2007 | Miyachi et al. | 428/654 |
| 8,062,764 B2 | | 11/2011 | Ueda et al. | |
| 2002/0078566 A1 | * | 6/2002 | Torigoe et al. | 29/890.03 |

(Continued)

FOREIGN PATENT DOCUMENTS

CN    201166528    12/2008
JP    04-371368    12/1992

(Continued)

OTHER PUBLICATIONS

Office Action dated Oct. 2, 2012 issued in corresponding Japanese Application No. 2009-092390 with English translation.

(Continued)

*Primary Examiner* — Tho V Duong
(74) *Attorney, Agent, or Firm* — Harness, Dickey & Pierce, PLC (57) ABSTRACT

A tube for a heat exchanger is formed by bending a three-layer clad material of an aluminum alloy to have an overlapped portion. The three-layer clad material is formed by a core material layer containing Mg not smaller than 0.2 wt % after brazing, a brazing material layer on one surface of the core material layer, and a high melting-point material layer on the other surface of the core material layer. The brazing material layer has a thickness not smaller than 25 μm before the brazing, and has a melting point lower than 600° C. The high melting-point material layer has a melting point equal to or higher than 600° C. In addition, the brazing material layer and the high melting-point material layer opposite to each other in the overlapped portion are bonded by the brazing at a temperature not lower than 450° C. for a time within 12 minutes.

12 Claims, 5 Drawing Sheets

(56) References Cited

U.S. PATENT DOCUMENTS

| | | | |
|---|---|---|---|
| 2003/0033715 A1 | 2/2003 | Iriyama et al. | |
| 2006/0141282 A1* | 6/2006 | Ueda et al. | 428/650 |
| 2006/0219393 A1* | 10/2006 | Igami | 165/133 |
| 2007/0166565 A1 | 7/2007 | Fukumoto et al. | |
| 2007/0246509 A1 | 10/2007 | Koshigoe et al. | |
| 2009/0020585 A1 | 1/2009 | Fukumoto et al. | |
| 2009/0165901 A1* | 7/2009 | Koshigoe et al. | 148/535 |
| 2010/0051252 A1 | 3/2010 | Ninagawa et al. | |

FOREIGN PATENT DOCUMENTS

| | | |
|---|---|---|
| JP | 06-63734 | 3/1994 |
| JP | 08-176713 | 7/1996 |
| JP | 10-088266 | 4/1998 |
| JP | 10-130760 | 5/1998 |
| JP | 2000-061624 | 2/2000 |
| JP | 2004076057 | 3/2004 |
| JP | 2005-009710 | 1/2005 |
| JP | 2005-161352 | 6/2005 |
| JP | 2006-131923 | 5/2006 |
| JP | 2006-152380 | 6/2006 |
| JP | 2007-51333 | 3/2007 |
| JP | 2007-277706 | 10/2007 |
| JP | 2007-277707 | 10/2007 |
| JP | 2008-261026 | 10/2008 |
| JP | 2008261025 A * | 10/2008 |
| JP | 2009-008374 | 1/2009 |
| WO | WO 2009/008172 | 1/2009 |
| WO | WO 2009/101896 | 8/2009 |

OTHER PUBLICATIONS

Office action dated Nov. 30, 2011 in corresponding Chinese Application No. 2010 10156855.5.

Examination Report dated Feb. 5, 2013 in corresponding Chinese Application No. 2010 1015 6855.5 with English translation.

Office Action dated Jul. 2, 2012 in corresponding Chinese Application No. 2010-10156855.5 with English translation.

Office Action mailed May 28, 2013 in the corresponding JP Application No. 2009-092390 with English translation thereof.

* cited by examiner

TUBE AND HEAT EXCHANGER USING THE SAME, AND METHOD OF MANUFACTURING TUBE

CROSS REFERENCE TO RELATED APPLICATION

This application is based on Japanese Patent Application No. 2009-092390 filed on Apr. 6, 2009, the contents of which are incorporated herein by reference in its entirety.

FIELD OF THE INVENTION

The present invention relates to a tube and a heat exchanger using the tube, and a method of manufacturing the tube. The tube is made of a three-layer clad material of an aluminum alloy.

BACKGROUND OF THE INVENTION

Conventionally, a heat exchanger is made of a three-layer clad material of an aluminum alloy, including a brazing material layer, a core material layer and a sacrifice material layer. In the heat exchanger, a flat tube is formed by bending the three-layer clad material. Component parts of the heat exchanger including a plurality of the tubes are assembled, and then the components parts are brazed by heating, so as to form the heat exchanger.

Recently, it is necessary to reduce the thickness of the component parts in order to reduce the entire weight of the heat exchanger. With this, in order to reduce the thickness of the component parts while the mechanical strength and the durability of the heat exchanger are maintained, the material for forming the tube is required to have a high strength. For example, JP 2006-131923A describes regarding an aluminum alloy clad material in which magnesium (Mg) is added in a core material layer in order to increase the strength.

However, when Mg is added in the core material layer, the Mg in the core material layer diffuses to the surface of the brazing material layer, and reacts with flux in a brazing, thereby forming a high melting-point chemical composition such as MgF2. Thus, the flux component is reduced in the brazing, thereby reducing the brazing performance.

In the clad material of the aluminum alloy described in JP 2006-131923A, a middle material layer is formed between the core material layer and the brazing material layer, so as to reduce diffusion of the Mg from the core material layer to the brazing material layer by using the middle material layer. However, in this case, the clad material is configured by four-layer structure of the brazing material layer, the middle material layer, the core material layer and the sacrifice material layer, and thereby the product cost of the heat exchanger is increased.

SUMMARY OF THE INVENTION

In view of the foregoing problems, it is an object of the present invention to provide a tube for a heat exchanger, and a heat exchanger using the tube, which can improve brazing performance with a high strength while reducing the product cost.

It is another object of the present invention to provide a method of manufacturing a tube for a heat exchanger, which can improve brazing performance with a high strength while reducing the product cost.

According to an aspect of the present invention, a tube for a heat exchanger is formed by bending a three-layer clad material of an aluminum alloy to have an overlapped portion bonded by brazing. The three-layer clad material includes a core material layer containing therein Mg equal to or larger than 0.2 wt % after the brazing, a brazing material layer provided on one surface of the core material layer, and a high melting-point material layer provided on the other surface of the core material layer. The brazing material layer has a thickness equal to or larger than 25 µm before the brazing and has a melting point lower than 600° C., and the high melting-point material layer has a melting point equal to or higher than 600° C. Furthermore, the brazing material layer and the high melting-point material layer are opposite to each other in the overlapped portion, and are bonded to each other in the overlapped portion by the brazing at a brazing temperature not lower than 450° C. for a time within 12 minutes.

Because the core material layer contains the Mg equal to or larger than 0.2 wt % after the brazing, a sufficient strength of the tube can be obtained. Furthermore, the thickness of the brazing material layer before the brazing is equal to or larger than 25 µm, and the brazing material layer and the high melting-point material layer opposite to each other in the overlapped portion are bonded to each other in the overlapped portion by the brazing at a brazing temperature not lower than 450° C. for a time within 12 minutes. Thus, it is possible to reduce diffusion of the Mg contained in the core material layer to the bonding surface, thereby improving the brazing performance. In addition, because the tube is formed by the three-layer clad material, the product cost of the tube can be reduced.

For example, the brazing temperature is in a temperature range equal to or higher than 450° C. and lower than 600° C. The high melting-point material layer may be a sacrifice material layer having a sacrifice anode effect with respect to the core material layer.

According to another aspect of the present invention, a method of manufacturing a tube for a heat exchanger includes a step of bending a three-layer clad material plate of an aluminum alloy to have a shape having an overlapped portion so as to form a tube assembly, and a step of brazing the tube assembly so as to form a passage in which a fluid flows. In the method, the three-layer clad material plate is formed by a core material layer containing therein Mg equal to or larger than 0.2 wt % after the brazing, a brazing material layer on one surface of the core material layer, and a high melting-point material layer on the other surface of the core material layer. Furthermore, the brazing material layer has a thickness equal to or larger than 25 µm before the brazing, and has a melting point lower than 600° C. On the other hand, the high melting-point material layer has a melting point equal to or higher than 600° C. The brazing material layer and the high melting-point material layer are opposite to each other in the overlapped portion, and are bonded to each other in the overlapped portion by the brazing at a brazing temperature not lower than 450° C. for a brazing time within 12 minutes. Thus, brazing performance of the tube can be increased with a high strength in the tube, while reducing product cost of the tube.

The brazing may be performed using the brazing material layer in a temperature range equal to or higher than 450° C. and lower than 600° C.

In the brazing, the brazing time may be the total of a first set time for which the brazing temperature is increased from 450° C. to 600° C., a second set time for which the brazing temperature is maintained approximately at 600° C., and a third set time for which the brazing temperature is decreased from 600° C. to 450° C. In this case, the first set time, the second set time and the third set time are continual in this order.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Figure 1:
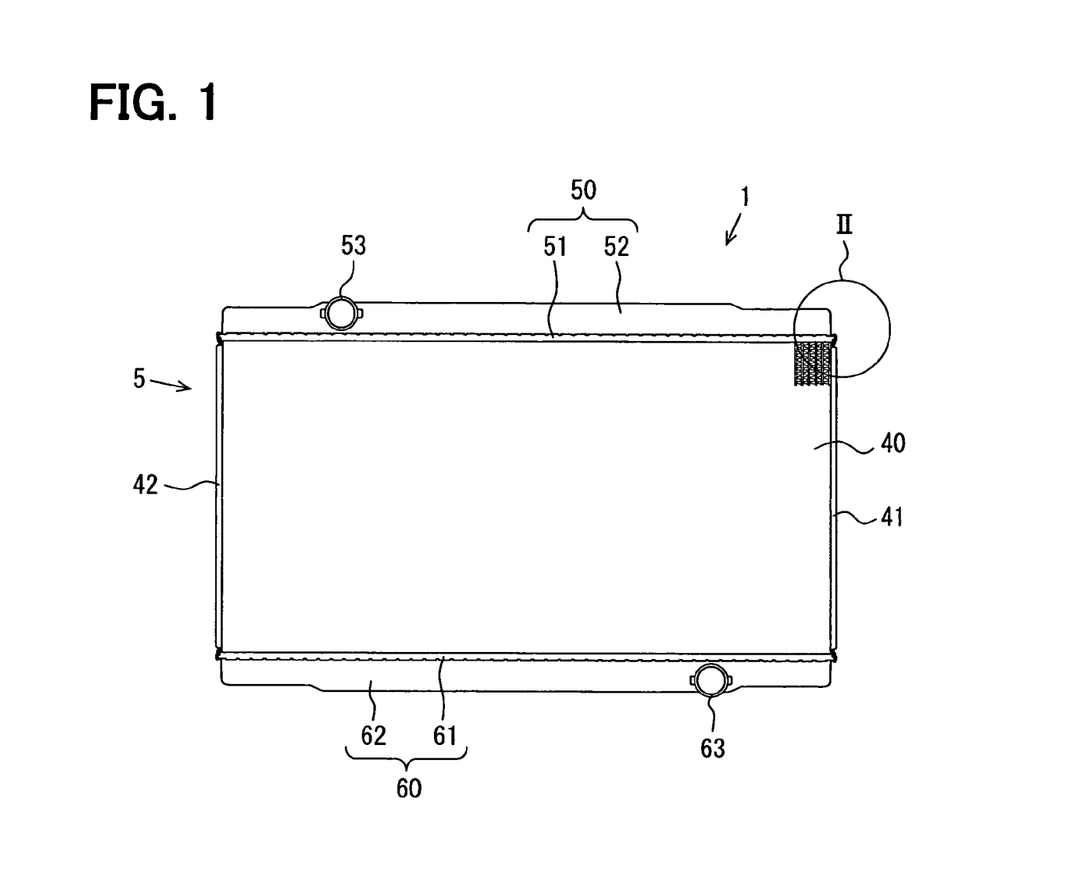
FIG. 1 is a schematic diagram showing a heat exchanger according to an embodiment of the present invention.
Figure 2:
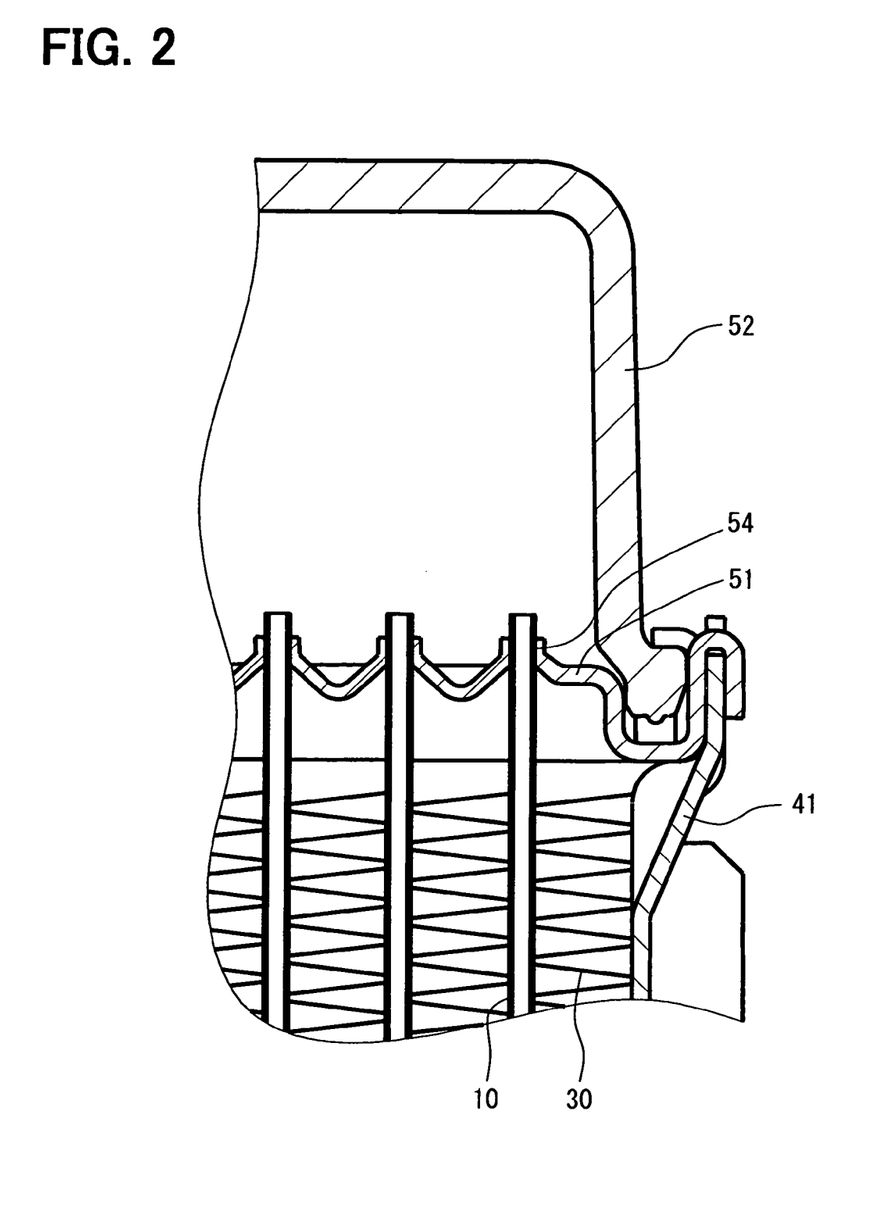
FIG. 2 is a cross-sectional view showing the structure of the part II in FIG. 1.

An embodiment of the present invention will be described with reference to FIGS. 1 to 6B. In the present embodiment, a radiator 1 shown in FIG. 1 is typically used as a heat exchanger to which the present invention is applied. As shown in FIGS. 1 and 2, the radiator 1 includes a core subassembly 5, and a pair of tank portions 52, 62 attached to opposite ends of the core subassembly 5. The core subassembly 5 is formed by integrally brazing a plurality components made of aluminum alloy, for example. The pair of tanks 52, 62 may be made of a resin, for example. The tank portion 52 is provided with an inlet port 53 from which a fluid such as engine coolant is introduced, and the tank portion 62 is provided with an outlet port 63 from which the fluid such as the engine coolant flows out.

The core subassembly 5 includes a core portion 40, in which heat exchange is performed between the engine coolant flowing therein and air passing therethrough, so that the engine coolant is cooled and air is heated. The core portion 40 includes a plurality of flat tubes 10, and a plurality of corrugated fins 30 connected to adjacent flat tubes 10. In the example of FIGS. 1 and 2, the flat tubes 10 extend in a top-bottom direction, and the corrugated fins 30, are provided to increase heat transmission area with respect to air. The flat tubes 10 and the corrugated fins 30 are alternately stacked in a horizontal direction that is an example of a stack direction. A pair of side plates 41, 42 are provided at two side ends of the core portion 40 in the stack direction, so as to reinforce mechanical strength of the core portion 40.

The core subassembly 5 includes a core plate 51 provided at an upper end of the core portion 40, and a core plate 61 provided at a lower end of the core plate 40, in the example of FIG. 1. The core plate 51 is disposed at the core subassembly 5 to configure an upper header tank 50 together with the tank portion 52, and the core plate 61 is disposed at the core subassembly 5 to configure a lower header tank 60 together with the tank portion 62. Each of the core plates 51, 61 is provided with a plurality of insertion holes 54 into which one end portions of the flat tubes 10 in the longitudinal direction are inserted.

Figure 3A:
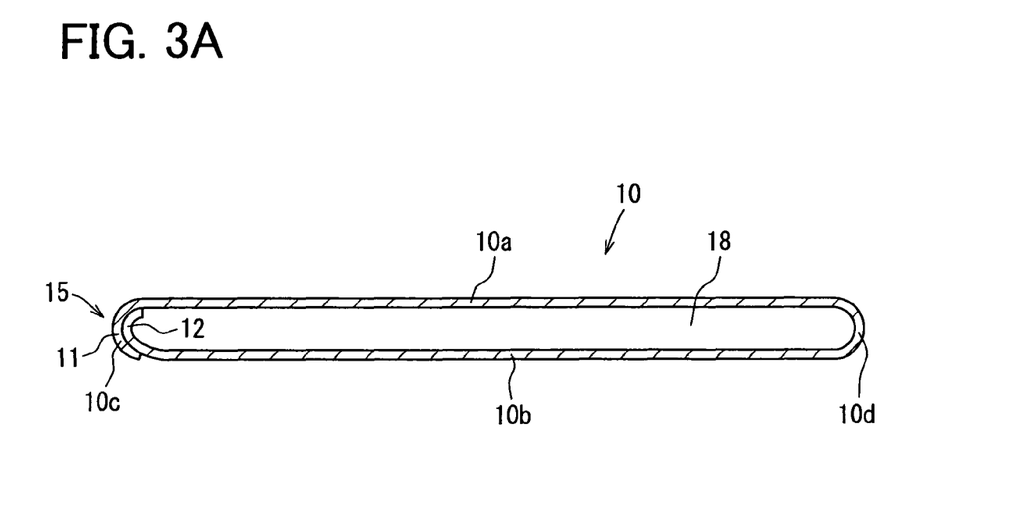
FIG. 3A is a cross-sectional view showing an example of a tube for the heat exchanger in FIG. 1.
Figure 3B:
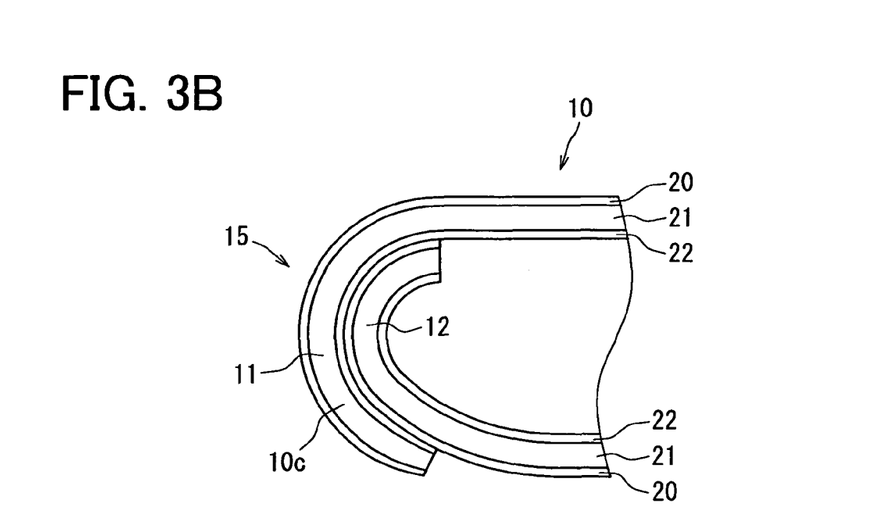
FIG. 3B is an enlarged diagram showing a part of the tube in FIG. 3A, according to the embodiment.

FIG. 3A is a cross-sectional view showing an example of the flat tube 10 according to the present embodiment, and FIG. 3B shows a connection portion in the flat tube 10 of the embodiment. In the example shown in FIGS. 3A and 3B, the flat tube 10 is approximately a flat elongated oval shape in cross section. The flat tube 10 is formed by bending a metal plate of a three-layer clad material in one direction, so as to form a tube assembly. The metal plate of the three-layer clad material is configured by a core material layer 21, a brazing material layer 20 formed on one surface of the core material layer 21, and a sacrifice material layer 22 formed on the other surface of the core material layer 21. The sacrifice material layer 22 is configured by a high melting-point material layer in the present embodiment. The high melting-point material layer is maintained at a solid state in the brazing.

The flat tube 10 includes a pair of flat portions 10a, 10b opposite to each other, and a pair of curved portions 10c, 10b each of which is curved approximately in a semi-cylindrical shape protruding to outside. The flat tube 10 defines therein a flat oval passage in which the engine coolant flows. The metal plate of the three-layer glad material for forming the flat tube 10 is connected at the curved portion 10c that is the connection portion. An overlapped portion 15, in which one end portion 11 of the metal plate is overlapped with the other end portion 12, is formed in the curved portion 10c. In the overlapped portion 15, the sacrifice material layer. 22 of the one end portion 11 is made to face the brazing material layer 20 of the other end portion 12. The brazing material layer 20 and the sacrifice material layer 22 opposite to each other in the overlapped portion 15 are bonded to each other via a brazing material fillet (not shown) that is formed by a molten brazing material, thereby forming the connection portion in the flat tube 10. Because the connection portion is formed in the flat tube 10, the passage 18 in the tube 10 can be air-tightly or liquid-tightly formed.

The core material layer 21, the brazing material layer 20 and the sacrifice material layer 22 are made of aluminum alloy. The core material layer 21 is made of an aluminum alloy containing Mg equal to or more than 0.2 wt % at the brazing. The sacrifice material layer 22 is made of an aluminum alloy including zinc (Zn) equal to or larger than 1.0 wt %, so that the electrical potential of the sacrifice material layer 22 is set lower than the electrical potential of the core material layer 22. Thus, the sacrifice material layer 22 can be maintained at a sacrifice anode effect with respect to the core material layer 21, thereby preventing a pitting corrosion or a gap corrosion of the core material layer 21. The brazing material layer 20 is made of Al—Si based alloy, for example, so that the melting point of the brazing material layer 20 is lower than that of the core material layer 21 and the sacrificial material layer 22. As an example, the melting point of the brazing material layer 20 is set lower than 600° C., and the melting point of the core material layer 21 and the sacrifice material layer 22 is set equal to or higher than 600° C.

Figure 4A:
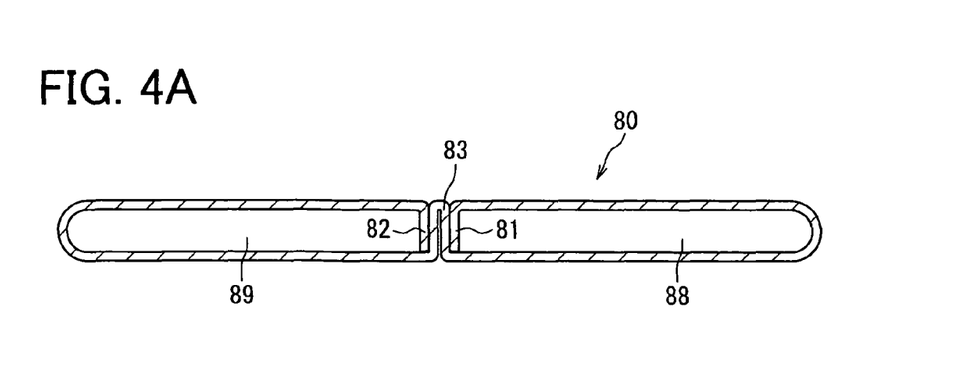
FIG. 4A is a cross-sectional view showing another example of a tube for the heat exchanger in FIG. 1.
Figure 4B:
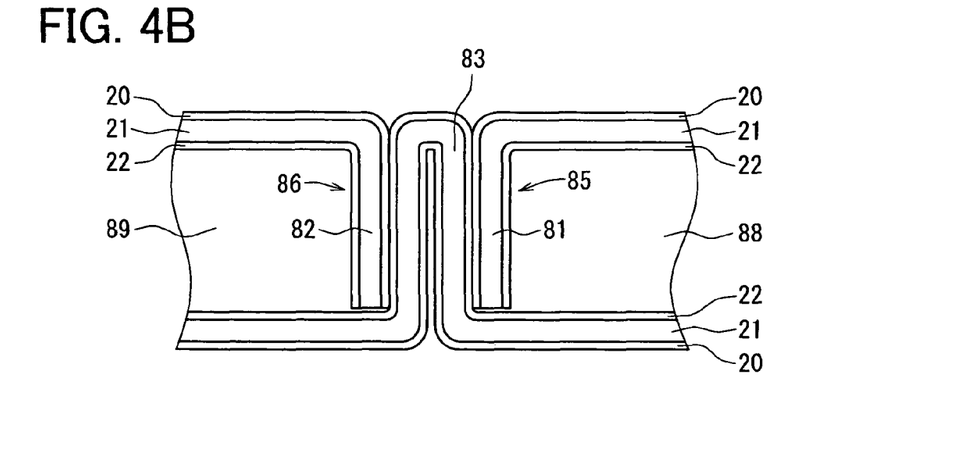
FIG. 4B is an enlarged diagram showing a part of the tube in FIG. 4A, according to the embodiment.

FIGS. 4A and 4B show another example of a flat tube 80 according to the present embodiment. FIG. 4A is a cross sectional view showing the flat tube 80, and FIG. 4B is an enlarged diagram showing a connection portion of the flat tube 80. As shown in FIGS. 4A and 4B, the flat tube 80 is provided with two passages 88, 89, and is approximately a flat B-like shape in cross-section. Similarly to the flat tube 10, the flat tube 80 is formed from a metal plate of a three-layer clad material including the brazing material layer 20, the core material layer 21 and the sacrifice material layer 22. The flat tube 80 has a folded protrusion portion 83 that is formed by folding a middle portion of the metal plate in a plate width direction and making the sacrifice material layer 22 to be protruded to outside.

One end portion 81 of the metal plate is bent to contact one side surface of the folded protrusion portion 83, thereby forming an overlapped portion 85 in which the one end portion 81 of the metal plate overlaps with the one side surface of the folded protrusion portion 83. As shown in FIG. 4B, the sacrifice material layer 22 of the one side surface of the folded protrusion portion 83 is opposite to the brazing material layer 20 of the one end portion 81, so as to contact the brazing material layer 20 of the one end portion 81. The brazing material layer 20 and the sacrifice material layer 22 opposite to each other in the overlapped portion 85 are bonded to each other via a brazing material fillet (not shown) that is formed by a molten brazing material, thereby forming the connection portion in the overlapped portion 85. Because the connection portion is formed in the overlapped portion 85 of the flat tube 80, the passage 88 in the tube 10 can be air-tightly or liquid-tightly formed.

The other end portion 82 of the metal plate is bent to contact the other side surface of the folded protrusion portion 83, thereby forming an overlapped portion 86 in which the other end portion 82 of the metal plate overlaps with the other side surface of the folded protrusion portion 83. As shown in FIG. 4B, the sacrifice material layer 22 of the other side surface 82 of the folded protrusion portion 83 is opposite to the brazing material layer 20 of the other end portion 82 so as to contact the brazing material layer 20 of the other end portion 82. The brazing material layer 20 and the sacrifice material layer 22 opposite to each other in the overlapped portion 86 are bonded to each other via a brazing material fillet (not shown) that is formed by a molten brazing material, thereby forming the connection portion in the overlapped portion 86. Because the connection portion is formed in the overlapped portion 86 of the flat tube 80, the passage 89 in the tube 10 can be air-tightly or liquid-tightly formed.

As described above, in each of the flat tubes 10, 80, the connection portion for air-tightly or liquid tightly sealing a tube passage is configured by bolding the brazing material layer 20 and the sacrifice material layer 22 which face to each other in the overlapped portion 15, 85, 86.

Next, a method of manufacturing the flat tube 10 and the radiator 1 including the flat tube 10 will be described. First, a rectangular band-like metal plate is formed by using a three-layer clad material configured by the brazing material layer 20, the core material layer 21 and the sacrifice material layer 22. Here, in the three-layer clad material, the core material layer 21 contains a predetermined Mg such that the consistency of the Mg after the brazing is equal to or larger than 0.2 wt %, and the brazing material layer 22 has a thickness of not smaller than 25 μm before the brazing. Then, the metal plate of the three-layer clad material is bent such that the brazing material layer 22 is positioned outside, and the one end portion 11 of the metal plate is overlapped with the other end portion 12 of the metal plate, thereby forming the flat tube 10 (tube assembly) having an elongated oval shape in cross section. In the example of the tube 10 shown in FIGS. 3A and 3B, the metal plate is turned in one turning direction without being turned in other direction.

A plurality of the corrugated fins 30 are prepared separately from the forming step of a plurality of the tubes 10. Next, the tubes 10 and the corrugated fins 30 are alternately stacked with each other so as to assemble the core portion 40. The core plates 51, 61 are respectively assembled to the core portion 40, thereby forming the core subassembly 5. In the core plate assembling, the longitudinal end portions of each flat tube 10 are respectively inserted into the insertion holes 54 of the core plates 51, 61.

Figure 5:
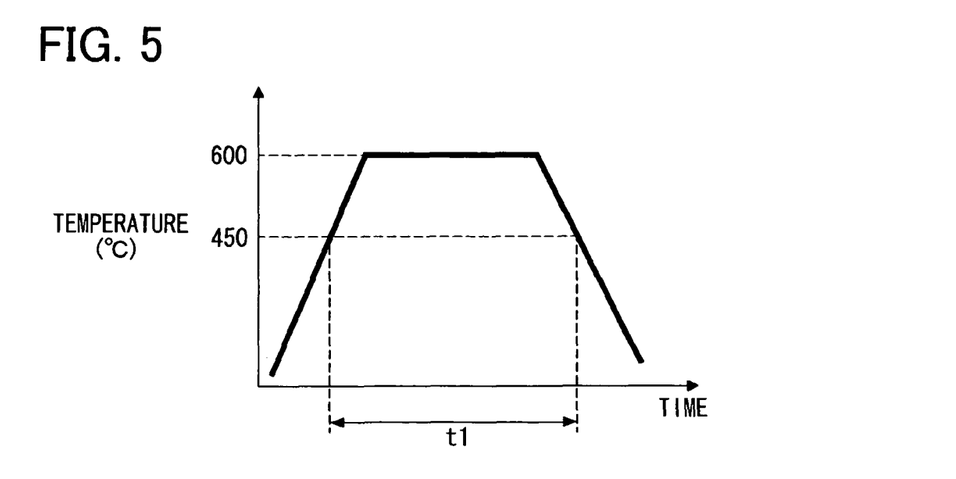
FIG. 5 is a graph showing an example of a heating pattern in a brazing.

Next, Nocolok flux is applied to the core subassembly 5, and then the core subassembly 5 is heated to melt the brazing material layer 20, thereby bonding the overlapped parts of the flat tube 10 and component parts of the core subassembly 5 to each other. FIG. 5 is a graph showing a heating pattern in the brazing. Specifically, FIG. 5 shows the relationship between a heating time and a heating temperature (material temperature), in the brazing. In the present embodiment, the heating temperature is set in a temperature range higher than the melting point of the brazing material layer 20 and lower than the melting point of the core material layer 21 and the sacrifice material layer 22, in the brazing. As an example, the heating temperature in the brazing is set in a range from 450° C. to 600° C., and a heating time t1 for which the heating temperature is equal to or higher than 450° C. is set at a predetermined time within 12 minutes.

Next, the tanks 52, 62 made of a resin are assembled to the core subassembly 5, thereby forming the radiator 1.

In the present embodiment, the flat tube 10 is provided to have the following features (i) to (iv): (i) the core material layer 21 contains the Mg equal to or larger than 0.2 wt % after the brazing; (ii) the brazing material layer 20 and the sacrifice material layer 22 are opposite to each other and are bonded each other in the overlapped portion 15 of the flat tube 10; (iii) the heating time t1 for which the heating temperature is equal to or higher than 450° C. is set at a predetermined time within 12 minutes; and (iv) the thickness of the brazing material layer 20 before brazing is equal to or larger than 25 μm.

Because the above conditions (i) to (iv) are satisfied in the flat tube 10, the brazing performance of the flat tube 10 can be effectively improved. The Mg amount contained in the core material layer 21 after the brazing is determined based on the following experiments.

Plates made of four-kind three-layer clad materials, in which the Mg amounts are different from each other in the core material layer 21, are prepared. Here, each thickness of the plates of the four-kind three-layer clad materials is at 0.2 mm, the thickness of the brazing material layer 20 in each plate is set at 40 μm, and the thickness of the sacrifice material layer 22 in each plate is set at 40 μm, before a brazing.

Then, the plates of the four-kind three-layer clad materials are heated at a temperature equal to or higher than 450° C. for a predetermined time t1 in the same heating pattern as that in the graph of FIG. 5. Here, the predetermined time t1 can be set at 12 minutes or a time smaller than 12 minutes. In the heating pattern shown in the graph of FIG. 5, the heating temperature is increased from 450° C. to 600° C. for a first set time, the heating temperature is kept approximately at 600° C. for a second set time, and the heating temperature is decreased from 600° C. to 450° C. for a third set time. The predetermined time t1 is the total time of the first to third set times, for which the brazing is continuously performed. After the heating is performed, the Mg amount contained in each core material layer 21 of the plates of the four-kind three-layer clad materials is measured, and the strengths of the plates are measured based on tension tests. When the tension strength is equal to or larger than 185 MPa, the determination of the strength is good and is indicated by "O" in Table 1. When the tension strength is smaller than 185 MPa, the determination of the strength is bad and is indicated by"X" in Table 1. As in Table 1, in the plates A1 to A4, the Mg amount contained in the core material layer 21 is changed from 0% to 0.4%, and the tension strength is measured.

TABLE 1

| Plate | Mg amount in core material layer after heating | Tension strength after heating | Strength Determination |
|---|---|---|---|
| A1 | 0 wt % | 160 MPa | X |
| A2 | 0.1 wt % | 180 MPa | X |
| A3 | 0.2 wt % | 190 MPa | ○ |
| A4 | 0.4 wt % | 250 MPa | ○ |

Next, the inventors of the present application perform experiments for estimating the brazing performance, so as to determine the conditions for obtaining a good brazing performance of the tube containing the Mg in the core material layer 21. In the experiments for estimating the brazing performance, three-layer clad materials in which the Mg amount in each core material layer 21 becomes 0.2 wt % after the heating are used, the heating time for which the heating temperature is equal to or higher than 450° C. is set at 12 minutes or 18 minutes, the thickness of the brazing material 20 is set at 20 μm or 25 μm, and combination of the bonding surfaces is set at a combination of the brazing material layer and the sacrifice material layer or a combination of the brazing material layer and the brazing material layer.

Figure 6A:
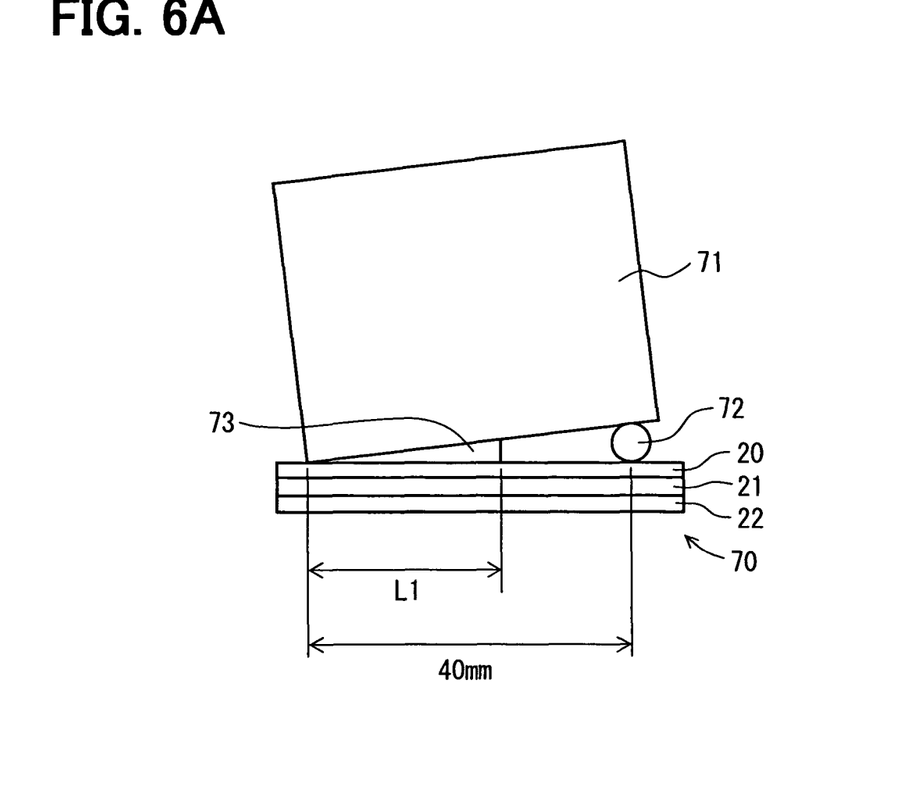
FIG. 6A is a schematic diagram showing a gap-filling sample piece of a clad material, used for measuring a brazing performance.
Figure 6B:
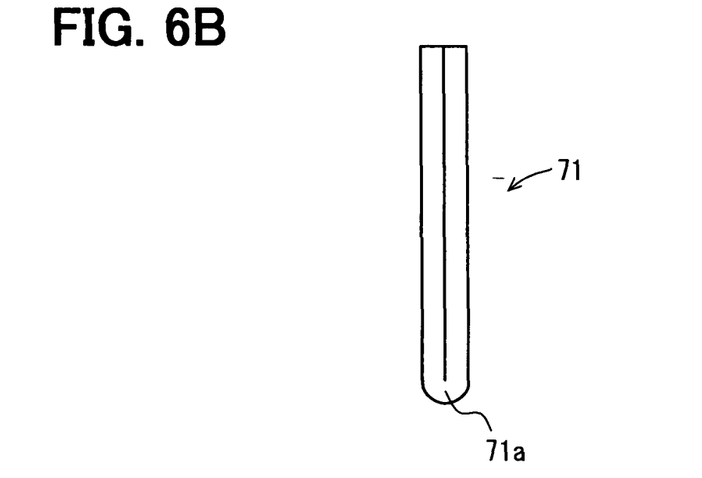
FIG. 6B is a schematic diagram showing a vertical material in the gap-filling sample piece in FIG. 6A.

FIGS. 6A and 6B show a gap-filling sample piece used for the estimation of the brazing performance, in which a horizontal material 70 and a vertical material 71 are provided. The horizontal material 70 of the three-layer clad material is arranged horizontally such that the brazing material layer 20 becomes the top surface, and a flux is applied to the surface of the brazing material layer 20 by 10 g/m². A three-layer clad material having the same configuration as the horizontal material 70 is bent in a U-shape shown in FIG. 6B such that the sacrifice material layer 22 or the brazing material layer 20 is positioned outside, thereby forming the vertical material 71 having a bent portion 71a. One end of the bending portion 71a of the vertical portion 71 is made to contact the brazing material layer 20 on the top surface of the horizontal material 70, and a spacer rod 72 (φ2 mm) made of SUS is arranged between the other end portion of the bent portion 71 and the horizontal material 70, at a position separated from the contact position by a predetermined distance (e.g., 40 mm in FIG. 6A).

At this state, the horizontal material 70 and the vertical material 71 are fixed to each other by using a wire made of SUS. Thus, an examination piece, in which the brazing material layer 20 of the horizontal material 70, and the sacrifice material layer 22 or the brazing material layer 20 of the vertical material 71 are opposite to each other via a wedge space, is prepared as shown in FIG. 6A. Then, the examination piece of FIG. 6A is heated for a predetermined time, and a length of a brazing material fillet 73 filled in the clearance is measured. The length of the brazing material fillet 73 corresponds to a gap filling length.

The length of the brazing material fillet 73 is measured in respective examination pieces B1 to B6 with different conditions, and the brazing performance is estimated respectively in the examination pieces B1 to B6. That is, the conditions are a heating time for which the heating temperature is equal to more than 450° C., the thickness of the brazing material layer before the heating, and the combination of the bonding surfaces. The heating time is set at 12 minutes or 18 minutes while having the same heating pattern in FIG. 5. The thickness of the brazing material layer before the heating is set at 20 μm or 25 μm. Furthermore, the combination of the bonding surfaces in the brazing is the combination of the brazing material and sacrifice material or the combination of the brazing material and the brazing material.

The estimation is performed when the tube is actually brazed in consideration with the sufficient bonding. For example, if the gap filling length (i.e., the length of the brazing material fillet 73) is equal to or larger than 15 mm, the determination of the brazing performance is good, and is indicated by "O" in Table 2. In contrast, if the gap filling length (i.e., the length of the brazing material fillet 73) is smaller than 15 mm, the determination of the brazing performance is bad, and is indicated by "X" in Table 2. The determination results are shown in Table 2.

When the combination of the bonding surfaces is set at the combination of the brazing material-brazing material, the brazing material layers 20 on both sides of the bonding surfaces becomes liquid in the heating, and thereby Mg is diffused from the core material layers 21 on both sides of the bonding surfaces. In contrast, when the combination of the bonding surfaces is set at the combination between the brazing material and the sacrifice material, the sacrifice material layer 22 on one side of the bonding surfaces is kept at the solid state, thereby reducing diffusion of the Mg from the core material layer 21. Thus, the diffusion of Mg from the core material layers 21 to the bonding surfaces can be reduced, thereby improving the brazing performance. As in the experiment pieces B1 and B3, even when the combination of the bonding surfaces is the combination between the brazing material and the sacrifice material, good brazing performance cannot be obtained depending on the thickness of the brazing material layer and the heating time at a temperature equal to or higher than 450° C., as in Table 2.

TABLE 2

| Experiment Piece | Heating time at temperature equal to more than 450° C. | Thickness of brazing material layer | Combination of bonding surfaces | Gap filling length | Brazing determination |
|---|---|---|---|---|---|
| B1 | 12 minutes | 20 μm | Brazing material - Sacrifice material | 12 mm | X |
| B2 | 12 minutes | 25 μm | Brazing material - Sacrifice material | 15 mm | ○ |
| B3 | 18 minutes | 25 μm | Brazing material - Sacrifice material | 10 mm | X |
| B4 | 12 minutes | 20 μm | Brazing material - Brazing material | 6 mm | X |
| B5 | 12 minutes | 25 μm | Brazing material - Brazing material | 8 mm | X |
| B6 | 18 minutes | 25 μm | Brazing material - Brazing material | 5 mm | X |

Next, the examination piece B2 and the examination piece B3 are compared, in which conditions other than the heating time are the same as in Table 2. When the heating time for which the heating temperature is equal to or higher than 450° C. is 18 minutes, the diffusion of Mg is increased.

Generally, the diffusion of the Mg is started from the temperature at 450° C., and the diffusion of the Mg can be reduced by shortening the heating time. If the heating time under the temperature equal to or higher than 450° C. is set at a predetermined time equal to or shorter than 12 minutes, the diffusion of the Mg can be reduced, thereby improving the brazing performance.

As in the experiment pieces B1 and B2 of Table 1, even if the conditions other than the thickness of the brazing material layer 20 are the same, the brazing performance is changed based on the thickness of the brazing material layer 20. According to the experiment piece B2, when the thickness of the brazing material layer 20 is set equal to or larger than 25 μm before the brazing, the brazing performance can be improved.

When the thickness of the brazing material layer 20 is larger, the distance between the core material layer 21 and the bonding surface becomes larger, thereby reducing diffusion of Mg from the core material layer 21 to the bonding surface. As in the experiment pieces B3, B5 and B6, even when the thickness of the brazing material layer 20 is equal to or larger than 25 μm, the brazing performance may be not improved based on the other conditions shown in Table 2.

Thus, in the tube having the above condition (i), when all the conditions (ii), (iii) and (iv) are satisfied, a good brazing performance can be obtained. Here, the condition (i) is that the core material layer 21 contains the Mg equal to or larger than 0.2 wt % after the brazing. The condition (ii) is that the brazing material layer 20 and the sacrifice material layer 22 are opposite to each other and are bonded each other in the overlapped portion 15 of the flat tube 10. The condition (iii) is that the heating time t1 for which the heating temperature is equal to or higher than 450° C. is set at the predetermined time equal to or smaller than 12 minutes. The condition (iv) is that the thickness of the brazing material layer 20 before brazing is equal to or larger than 25 μm.

According to the embodiment, when all the conditions (i) to (iv) are satisfied, the brazing performance of the flat tube 10 is sufficiently improved with a high strength. Furthermore, in the present embodiment, it is unnecessary to form a middle material layer for reducing the diffusion of the Mg in the metal plate, and thereby the flat tube 10 can be manufactured by the three-layer clad material configured by the brazing material layer 20, the core material layer 21 and the sacrifice material layer 22.

In the above experiments, the plate pieces are used in the example of the flat tube 10. However, the plate pieces may be used in the example of the flat tube 80. Thus, when the flat tube 10 or the flat tube 80 is used for a heat exchanger, the strength of the heat exchanger can be improved while improving the brazing performance.

Although the present invention has been fully described in connection with the preferred embodiment thereof with reference to the accompanying drawings, it is to be noted that various changes and modifications will become apparent to those skilled in the art.

For example, in the above embodiment, as the tube for a heat exchanger, the flat tube 10, 80 having an elongated oval shape in cross section is used. However, the tube may be formed into other shape in cross section without being limited to the flat shape, if the tube has an overlapped portion and the overlapped portion is bonded by brazing.

In the above-described embodiment, the radiator 1 is used as an example of the heat exchanger. However, the tube of the present invention can be suitably used for any heat exchanger.

In the above embodiment, the sacrifice material layer 22 is used as a high melting-point material layer, so as to secure the sacrificial anode effect with respect to the core material layer 21. However, when a material layer having a melting point higher than 600° C. of the brazing material layer 20 is provided in the clad material, the material layer other than the sacrifice material layer 22 can be used as the high melting-point material layer.

In the above-described embodiment, the heating, time t1, for which the heating temperature is not lower than 450° C. and not higher than 600° C., is set within 12 minutes. Preferably, the heating time t1 may be set in a range from 1 minute to 12 minutes, in order to sufficiently perform the brazing. More preferably, the heating time t1 may be set in a range from 3 minutes to 12 minutes, in order to sufficiently perform the brazing. More preferably, the heating time t1 may be set in a range from 5 minutes to 12 minutes, in order to more sufficiently perform the brazing. Still more preferably, the heating time t1 may be set in a range from 7 minutes to 12 minutes, or in a range from 9 to 12 minutes, in order to more sufficiently perform the brazing.

Such changes and modifications are to be understood as being within the scope of the present invention as defined by the appended claims.

What is claimed is:

1. A tube for a heat exchanger, the tube being formed by bending a three-layer clad material of an aluminum alloy to have an overlapped portion bonded by brazing, the three-layer clad material comprising:
   a core material layer containing therein Mg equal to or larger than 0.2 wt % after the brazing;
   a brazing material layer provided on a first surface of the core material layer, wherein the brazing material layer has a thickness equal to or larger than 25 μm before the brazing, and has a melting point lower than 600° C.; and
   a high melting-point material layer provided on a second surface of the core material layer opposite the first surface, the high melting-point material layer having a melting point equal to or higher than 600° C., wherein
   the brazing material layer and the high melting-point material layer are in direct contact with each other in the overlapped portion, and are bonded to each other in the overlapped portion by the brazing at a brazing temperature not lower than 450° C. for a time within 12 minutes; and
   the overlapped portion includes a first high melting point material layer, a first core material layer, a first brazing material layer, a second high melting point material layer, a second core material layer and a second brazing material layer in this order from an inside of the tube to an outside of the tube.

2. The tube for a heat exchanger according to claim 1, wherein the brazing temperature is in a temperature range equal to or higher than 450° C. and lower than 600° C.

3. The tube for a heat exchanger according to claim 1, wherein the high melting-point material layer is a sacrifice material layer having a sacrifice anode effect with respect to the core material layer.

4. A heat exchanger for performing heat exchange, the heat exchange includes the tube according to claim 1.

5. The tube for a heat exchanger according to claim 1, wherein the tube defines an internal fluid passage, the high melting material layer being in direct contact with fluid in the internal fluid passage.

6. The tube for a heat exchanger according to claim 1, wherein a first surface of the tube directly contacts a second surface of the tube opposite to the first surface in the overlapped portion.

7. A tube for a heat exchanger, the tube being formed by bending a three-layer clad material of an aluminum alloy to have an overlapped portion bonded by brazing, the three-layer clad material comprising:

a core material layer containing therein Mg equal to or larger than 0.2 wt % after the brazing;

a brazing material layer provided on a first surface of the core material layer, wherein the brazing material layer has a thickness equal to or larger than 25 μm before the brazing, and has a melting point lower than 600° C.; and a high melting-point material layer provided on a second surface of the core material layer opposite the first surface, the high melting-point material layer having a melting point equal to or higher than 600° C., wherein the brazing material layer and the high melting-point material layer are in direct contact with each other in the overlapped portion, and are bonded to each other in the overlapped portion by the brazing at a brazing temperature not lower than 450° C. for a time within 12 minutes; and first non-linear end of the tube overlaps a second non-linear end of the tube to form the overlapped portion.

8. The tube for a heat exchanger according to claim 7, wherein the brazing temperature is in a temperature range equal to or higher than 450° C. and lower than 600° C.

9. The tube for a heat exchanger according to claim 7, wherein the high melting-point material layer is a sacrifice material layer having a sacrifice anode effect with respect to the core material layer.

10. A heat exchanger for performing heat exchange, the heat exchange includes the tube according to claim 7.

11. The tube for a heat exchanger according to claim 7, wherein the tube defines an internal fluid passage, the high melting material layer being in direct contact with fluid in the internal fluid passage.

12. The tube for a heat exchanger according to claim 7, wherein a first surface of the tube directly contacts a second surface of the tube opposite to the first surface in the overlapped portion.

* * * * *